United States Patent
Chitale et al.

(10) Patent No.: US 10,831,988 B2
(45) Date of Patent: *Nov. 10, 2020

(54) SYSTEM, METHOD AND COMPUTER PROGRAM PRODUCT TO GENERATE A WEB APPLICATION USING REUSABLE THEMES

(71) Applicant: OPEN TEXT CORPORATION, Waterloo (CA)

(72) Inventors: Sandip V. Chitale, Pleasanton, CA (US); Sachin Gopaldas Totale, Pleasanton, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,351

(22) Filed: Jun. 27, 2019

(65) Prior Publication Data

US 2019/0317982 A1    Oct. 17, 2019

Related U.S. Application Data

(60) Continuation of application No. 15/615,561, filed on Jun. 6, 2017, now Pat. No. 10,372,797, which is a
(Continued)

(51) Int. Cl.
*G06F 40/154*    (2020.01)
*G06F 16/955*    (2019.01)
(Continued)

(52) U.S. Cl.
CPC ........ *G06F 40/154* (2020.01); *G06F 16/9566* (2019.01); *G06F 16/986* (2019.01); *G06F 40/186* (2020.01)

(58) Field of Classification Search
CPC ..... G06F 16/955; G06F 16/986; G06F 40/154
See application file for complete search history.

(56) References Cited

U.S. PATENT DOCUMENTS 7,904,570 B1 * 3/2011 Kroupa ................. G06F 16/10
  709/229
9,703,762 B1    7/2017 Chitale et al.
(Continued)

OTHER PUBLICATIONS

David Gourley et al., "HTTP: The Definitive Guide", 2009 O'Reilly Media, ch 5.7.
(Continued)

*Primary Examiner* — Asher D Kells
(74) *Attorney, Agent, or Firm* — Sprinkle IP Law Group

(57) ABSTRACT

In general, the technology relates to a method for using reusable themes. The method includes receiving, from a device, a request for a style sheet language file, where the style sheet language file defines a reusable theme for a webpage and specifies a relative location for an image that is used by the reusable theme. The method further includes receiving a request for the image including the relative location of the image, resolving the relative location for the image to obtain an absolute location for the image using a location of the style sheet language file in a web application structure, obtaining the image from the absolute location of the image, and providing the image to the device.

18 Claims, 6 Drawing Sheets

Related U.S. Application Data division of application No. 14/585,981, filed on Dec. 30, 2014, now Pat. No. 9,703,762.

(51) Int. Cl.
  *G06F 16/958* (2019.01)
  *G06F 40/186* (2020.01)

(56) References Cited

U.S. PATENT DOCUMENTS

| | | | |
|---|---|---|---|
| 10,372,797 B2 | 8/2019 | Chitale et al. | |
| 2004/0187076 A1* | 9/2004 | Ki | H04L 67/303 |
| | | | 715/208 |
| 2006/0095422 A1* | 5/2006 | Kikuchi | G06F 16/957 |
| 2009/0276488 A1* | 11/2009 | Alstad | H04L 67/303 |
| | | | 709/203 |
| 2011/0258535 A1* | 10/2011 | Adler, III | G06F 40/126 |
| | | | 715/235 |
| 2014/0173417 A1* | 6/2014 | He | G06F 40/123 |
| | | | 715/234 |
| 2015/0082214 A1 | 3/2015 | Roessler et al. | |
| 2015/0149891 A1 | 5/2015 | Magistrado | |
| 2017/0270081 A1 | 9/2017 | Chitale et al. | |

OTHER PUBLICATIONS

R. Fielding et al., "Hypertext Transfer Protocol—HTTP/1.1", Jun. 1999, Network Working Group, sec. 5.

"Using Relative URL in CSS File, What Location Is It Relative To?", 2009 Stack Overflow, http://stackoverflow.com/questions/940451/using-relative-url-in-css-file-what-location-is-it-relative-to.

Office Action issued for U.S. Appl. No. 15/615,561, dated Sep. 4, 2018, 8 pages.

"All About File Paths," [retrieved from https://kirupa.com/html5/all_about_file_paths.htm, Kirupa, Sep. 4, 2014, 11 pages.

Notice of Allowance issued for U.S. Appl. No. 15/615,561, dated Mar. 22, 2019, 5 pages.

* cited by examiner

SYSTEM, METHOD AND COMPUTER PROGRAM PRODUCT TO GENERATE A WEB APPLICATION USING REUSABLE THEMES

CROSS-REFERENCE TO RELATED APPLICATIONS

This application is a continuation of, and claims a benefit of priority under 35 U.S.C. 120 of the filing date of U.S. patent application Ser. No. 15/615,561, filed Jun. 6, 2017, entitled "SYSTEM, METHOD AND COMPUTER PROGRAM PRODUCT TO GENERATE A WEB APPLICATION USING REUSABLE THEMES," which is a is a divisional of, and claims a benefit of priority under 35 U.S.C. 120 of the filing date of U.S. patent application Ser. No. 14/585,981, filed Dec. 30, 2014, entitled "METHOD AND SYSTEM FOR PROCESSING A STYLE SHEET DEFINING A REUSABLE THEME FOR A WEB PAGE AND SPECIFYING A RELATIVE LOCATION OF CONTENT," now issued as U.S. Pat. No. 9,703,762 on Jul. 11, 2017, entire contents of which are hereby expressly incorporated by reference for all purposes.

BACKGROUND

A network is a set of interconnected computing devices that may communicate with each other. Web applications are applications that are developed for the network that include a series of webpages. Each webpage may include a button or other navigation control that links to another webpage in the series of webpages. Further, the web applications may be designed to have a specific look and feel.

DETAILED DESCRIPTION

Figure 1:
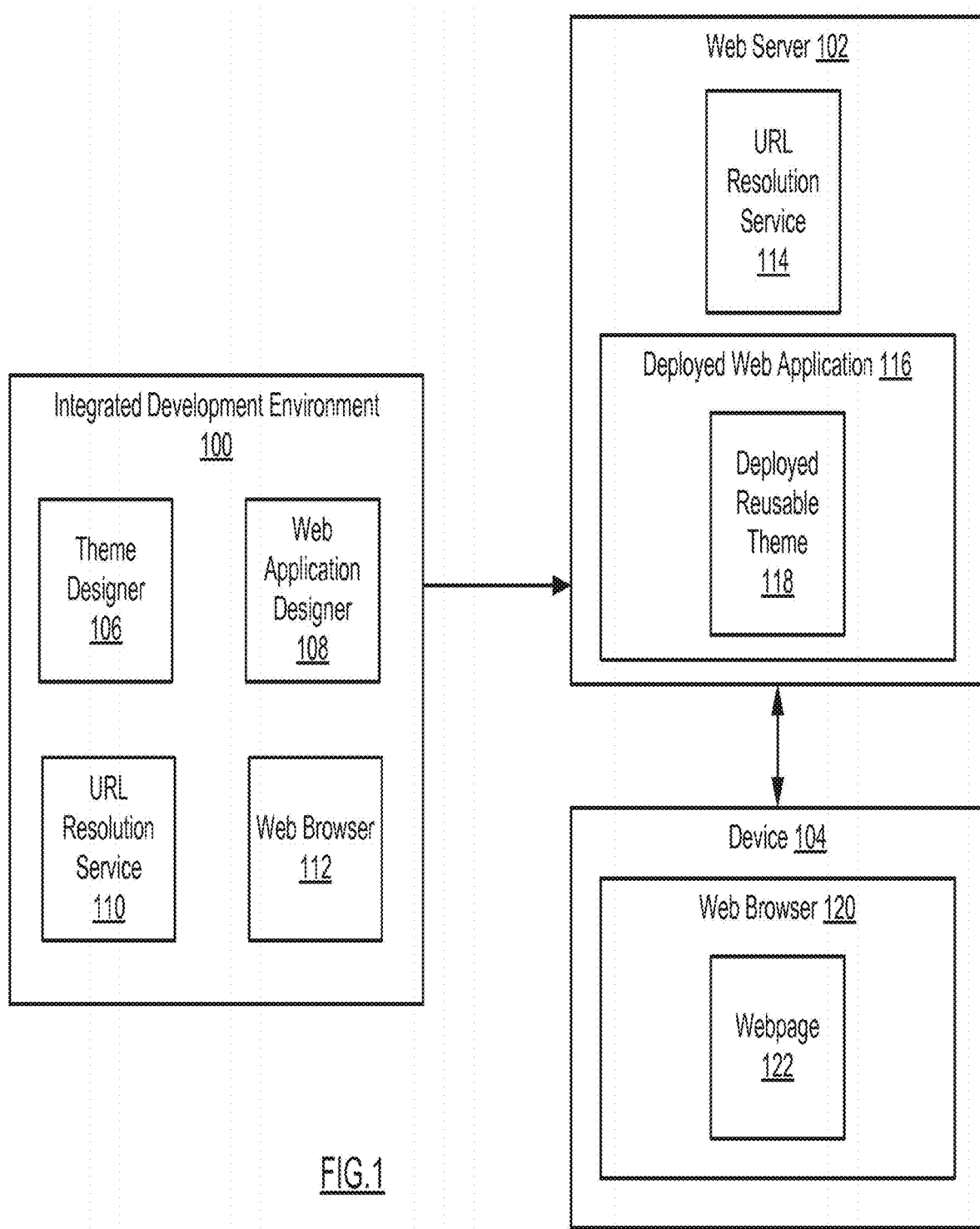
FIG. 1 shows an example system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology relate to creating reusable themes to be used across web applications. More specifically, embodiments of the technology relate to creating and deploying reusable themes such that a given reusable theme may be used across multiple web applications without requiring the theme to be rewritten or revised.

In one embodiment of the technology, a web application refers to an application that is implemented by a web server. The web application includes a series of webpages and logic that is used to: (i) perform various actions on the webpages (and (ii) transition between webpages. The user interacts with the web application via a web browser on their device. The logic associated with the web application (typically in the form of executable code) may be performed by the web server, the client device, or any combination thereof. Further, the logic associated with the web application may also enable the web server to communicate with other web servers, third party services, etc.

In one embodiment of the technology, the look and feel of the web application is defined by the theme. The theme may specify, for example, the font, the size of the font, and the color of text and lines on webpages within the web application. The theme may also specify which images to show for given functions that are presented to the user. For example, if the web application defines a search function where the user is able to enter a search string into a text field presented on a webpage, then the theme may specify the image (e.g., a magnifying glass) that is to be shown on the button that triggers the search function. Continuing with the example, if the search function is present in multiple webpages within the web application, then the same image may be displayed on corresponding buttons on each of those webpages.

FIG. 1 shows a system in accordance with one or more embodiments of the technology. The system includes an integrated development environment (IDE) (100) and a web server (102). Each of these components is described below.

In one embodiment of the technology, the IDE (100) is implemented on a computing system, such as the one shown in FIG. 6 and described below. The IDE (100) is a set of software development tools that include functionality to enable a user to a build a reusable theme and/or that allow a web application designer to build a web application. Further, the IDE (100) may include a user interface (UI) that facilitates the development of the reusable themes and the development of web applications (see e.g., FIG. 5).

In one embodiment of the technology, the IDE includes a theme designer (106). The theme designer (106) is a set of software development tools that provide a user (e.g., a developer) with functionality to create a reusable theme, which may be subsequently applied to different web applications.

Figure 2:
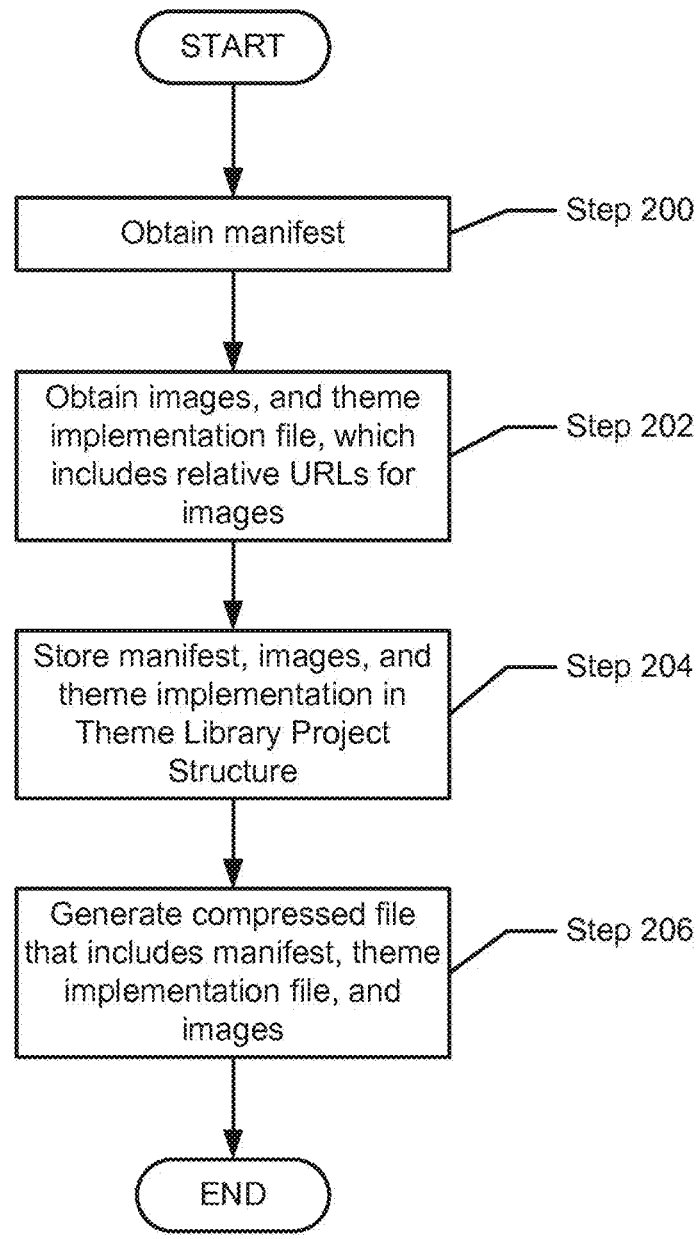
FIG. 2 shows an example method for creating a reusable theme in accordance with one or more embodiments of the technology.

Continuing with the discussion of FIG. 1, the theme designer (106) may include functionality to enable the user to perform the steps shown in FIG. 2 including, but not limited to, (i) obtaining a manifest, (ii) obtaining a theme implementation file and images specified in the theme implementation file, and (iii) generating the compressed file. Additional details related to the creation reusable theme are described in FIG. 2.

In one embodiment of the technology, the IDE includes a web application designer (108). The web application designer (108) is a set of software development tools that provide a user (e.g., a developer) with functionality to create web applications. For example, the web application designer (108) may include functionality to allow a user to design the UI of the web application and to design the logic that is implemented on each webpage within the web application and the logic that is used to transition between webpages in the web application. Further, the web application designer (108) may include functionality to import the compressed file(s) (see e.g., FIG. 3, step 300). Once imported, the user may then apply the reusable theme (see e.g., FIG. 3, steps 302-310) to the web application. The web application designer (108) may also include functionality to generate a deployed web application (116) that includes the deployed reusable theme (118) (see e.g., FIG. 3, step 318 and FIG. 4). Additional details related to the design of the web application and the application of the reusable theme to the web application are shown in FIG. 4 and described below.

In one embodiment of the technology, the IDE (100) also includes a uniform resource location (URL) resolution service and a web browser (112). The URL resolution service includes functionality to resolve relative URLs for images that are included within a style sheet language file. Additional detail regarding the resolution of relative URLs is described below, e.g., in FIG. 3, 312.

Further, the web browser (112) within the IDE (100) permits the user of the IDE to preview one or more webpages in the web application during the design process. More specifically, the web browser (112) includes functionality to interpret hypertext mark-up language (HTML) files, interpret style sheet language files, execute scripting language files (e.g., JavaScript files), and display webpages within the web browser based on the aforementioned processing. The IDE (100) includes functionality to receive requests from the web browser (e.g., HTTP requests) and provide corresponding responses (e.g., HTTP responses) to the web browser. From the perspective of the web browser (112), the IDE (100) functions as a web server (see e.g., 102). Further, the IDE (100) mediates the interaction between the web browser (112) and the URL resolution service (110). Additional details about the URL resolution service (110) is described in FIG. 3, 312 below.

Those skilled in the art will appreciate the theme designer (106), the web application designer (108), the URL resolution service (110), and the web browser (112) may be implemented in separate IDEs on separate computing systems without departing from the technology.

In one embodiment of the technology, a web server (102) is a computing system (e.g., a computing system described in FIG. 6) that includes functionality to host a deployed web application (116). Hosting the deployed web application (116) may include storing the necessary files for the deployed web application including source code, images, third-party libraries, etc. and then executing the deployed web application. Executing the deployed web application may include receiving HTTP requests from an device (104), processing the HTTP request, generating an HTTP response based on the processing of the HTTP request, and providing the HTTP response to the device. The web sever may use the URL resolution service (110) to aid in the processing of HTTP requests and/or the generation of HTTP responses. Additional detail about the operation of the web server (and the URL resolution service (114)) is described below in FIG. 4.

In one embodiment of the technology, the web server (102) may communicate (e.g., send and receive HTTP requests) with one or more devices (e.g., the computing systems in FIG. 6) over any wired network, wireless network, or any combination thereof. In one embodiment of the technology, the devices each include at least one web browser (120) that permits the device to display webpages (122) (provided with HTTP responses) to the end users. The web browser (120) includes substantially the same functionality as the web browser (112) within the IDE.

While FIG. 1 shows a configuration of components, other configurations may be used without departing from the scope of the technology. For example, various components may be combined to create a single component. As another example, the functionality performed by a single component may be performed by two or more components.

The following section describes various flowcharts in accordance with one or more embodiments of the technology. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that a condition exists in accordance with one or more embodiments of the technology. As another example, determination steps may be performed by performing a test, such as checking a data value to test whether the value is consistent with the tested condition in accordance with one or more embodiments of the technology.

FIG. 2 shows a method for creating a reusable theme in accordance with one or more embodiments of the technology.

In step 200, the manifest is obtained. Obtaining the manifest may include, but is not limited to, obtaining a manifest from a third party, creating the manifest, and/or obtaining the manifest from a third party and the subsequently modifying the manifest. The manifest is a file that defines the reusable theme. The manifest may include: a symbolic name for the reusable theme, a version of the reusable theme, a namespace for the reusable theme, and the name of the theme implementation file (i.e., the file that includes the source code for the reusable theme (e.g., a .scss file). The manifest may also include other metadata related to the reusable theme (e.g., manifest version, creator information, copyright information, etc.). An example of the manifest is included below.

In step 202, the images and the theme implementation file are obtained. In one embodiment of the technology, obtaining theme implementation file from a third party, creating the theme implementation file, or obtaining the theme implementation file from a third party and the subsequently modifying the theme implementation file. In one embodiment of the technology, obtaining the images may include obtaining copies of the images from a third party repository and/or creating the images using an appropriate image drawing application. The images obtained in step 202 correspond to images that are specified in the theme implementation file. In one embodiment of the technology, the theme implementation file includes the source code for the reusable theme. In one embodiment of the technology, the name of the theme implementation file corresponds to the name of the theme implementation file in the manifest. The theme implementation file may be a Sassy Cascading Style Sheet (SCSS) file or any other type of file that may be compiled into a CSS file (see FIG. 3, 306). The theme implementation file includes a relative location for each image that is to be used in the reusable theme (i.e., a relative location at which each image is stored). The relative location may correspond to a relative URL. The relative location only includes a portion of the information that is required to determine the actual location of the image. The relative location must be resolved to obtain an absolute location, where the absolute location includes all information that is necessary to obtain the image. In one embodiment of the technology, the relative location corresponds to the location of the image with respect to the location of the theme implementation file and/or style sheet language file (described below).

In one embodiment of the technology, the relative location is determined by specifying only the portion of the absolute location starting at the directory in which the image is located. For example, the relative location for the image search.png may be specified as follows: "images/search-.png". The corresponding absolute location for the image (within a deployed web application structure, see FIG. 4) may then be webapps/MyApp/Js/resources/css/images/search.png". In this example, the location of the style sheet language file is: "webapps/MyApp/Js/resources/css/."

In step 204, the manifest, the theme implementation file, and the images are stored in a theme library project structure (TLPS). In one embodiment of the technology, the TLPS is a hierarchical file structure that includes two or more levels, where each level may include files and or directories (which may include files and directories). The top level of the TLPS may be referred to root of the TLPS and the subsequent levels of the TLPS may be referred to as child levels. In one embodiment of the technology, the manifest may be stored at the root of the TLPS or in a direct child level of the root of the TLPS (i.e., the manifest is stored in a directory, where the directory is at the root of the TLPS). The images and the theme implementation file may be stored at any level in the TLPS provided with the theme implementation file and the directory in which all images are stored (i.e., all images referenced in the theme implementation file) are at the same level within the TLPS. Those skilled in the art will appreciate that the theme implementation file and the directory in which all images are stored may be in different locations within the TLPS without departing from the technology provided that the relationship between the theme implementation file and the directory in which all the images are stored is known.

In step 206, a compressed filed is generated where the compressed filed includes the contents of the TLPS and the compressed file maintains the hierarchical organization of the TLPS. In one embodiment of the technology, the compressed file is a Java Archive File (.JAR file) and the name of the compressed filed is based on the content of the manifest. For example, the name of compressed file may have the following format: [namespace].[symbolic name]-[version].jar, where namespace, symbolic name and version are all specified in the manifest.

Figure 3:
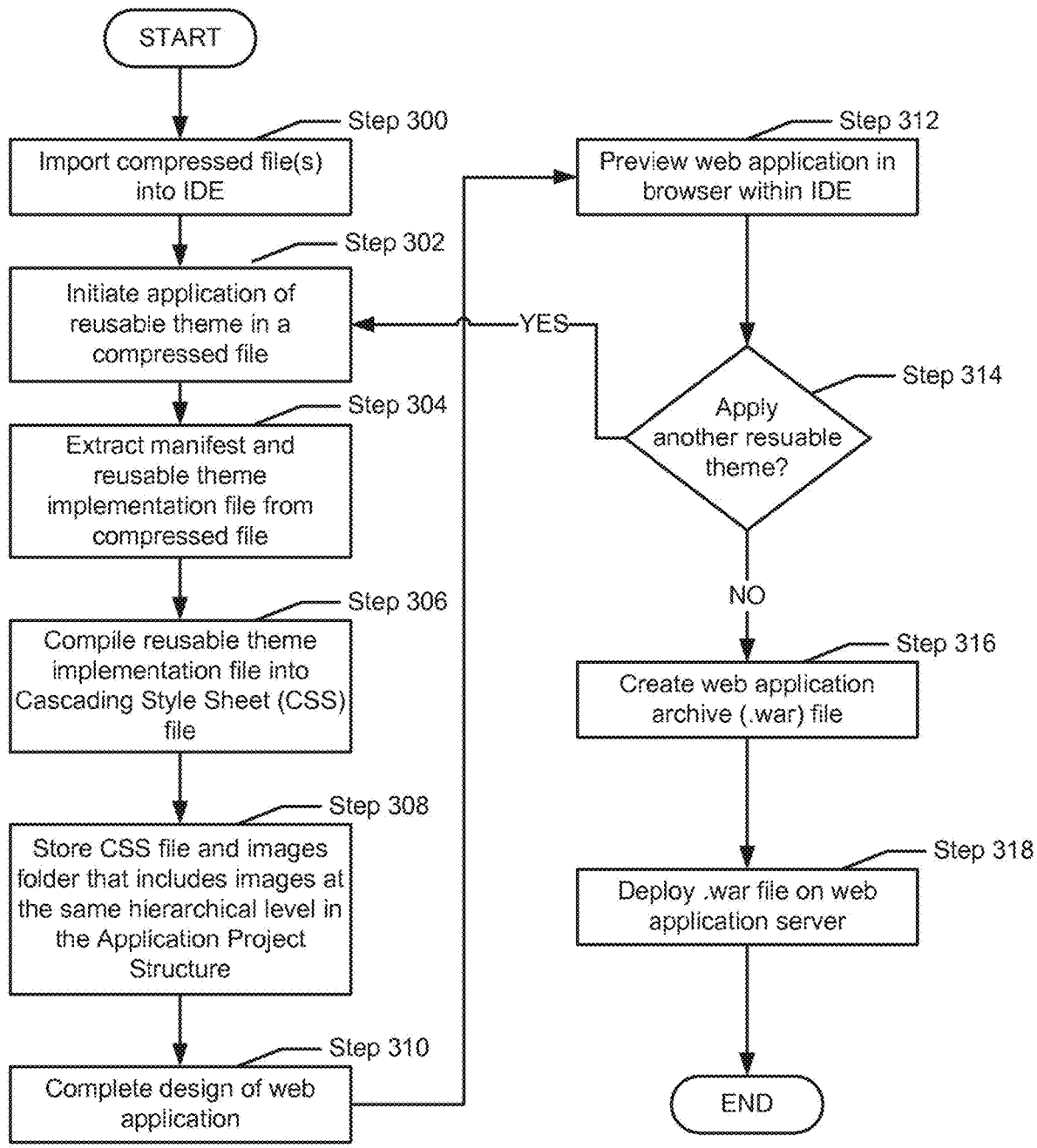
FIG. 3 shows an example method for building a web application that includes a reusable theme in accordance with one or more embodiments of the technology.
Figure 4:
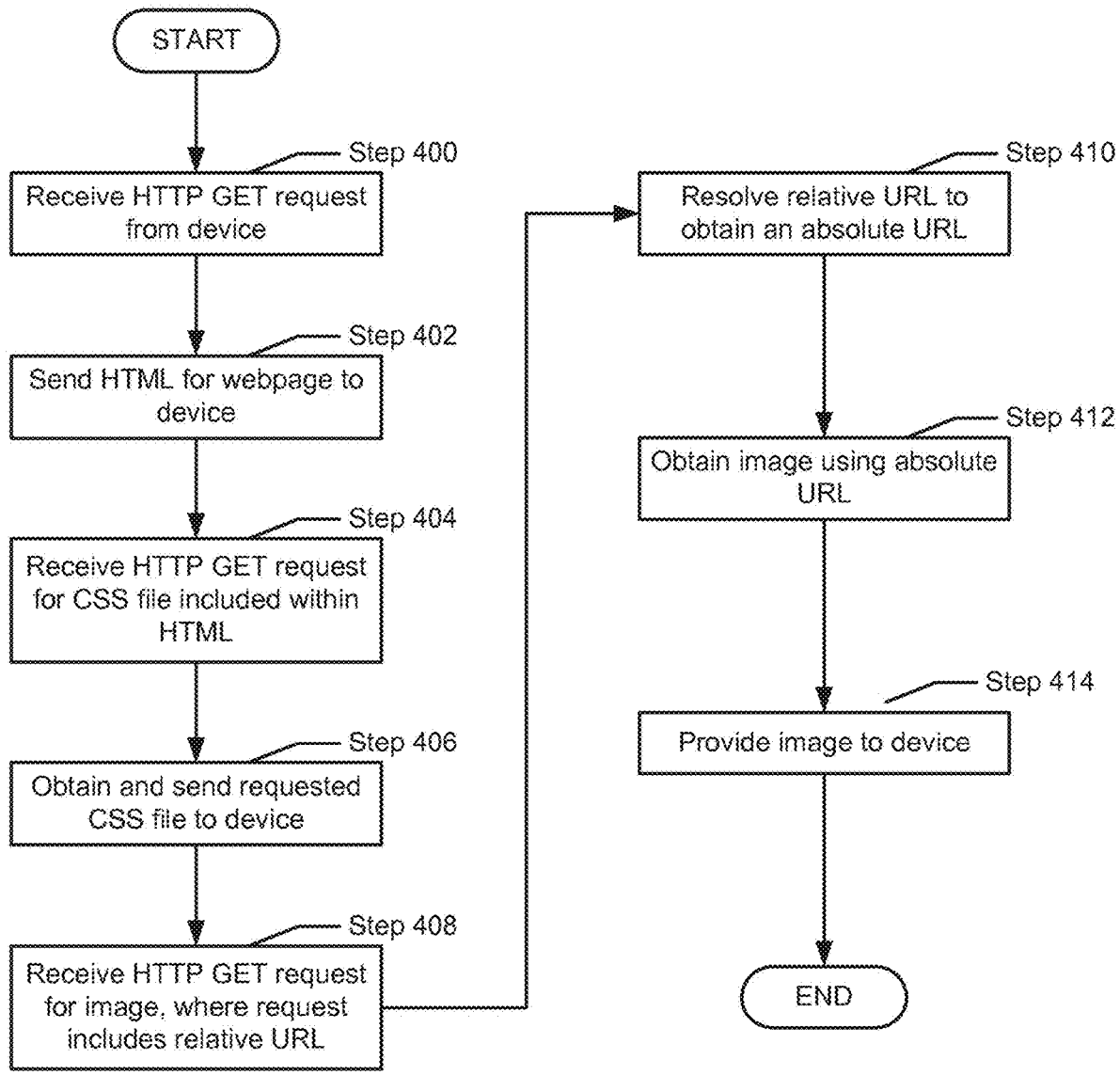
FIG. 4 shows an example method for using a reusable theme in a deployed web application in accordance with one or more embodiments of the technology.

FIG. 3 shows a method for building a web application that includes a reusable theme in accordance with one or more embodiments of the technology.

In step 300, one or more reusable themes are imported into the IDE. In one embodiment of the technology, importing the theme may include storing the compressed file in a particular directory within the computer system on which the IDE is executing.

Figure 5:
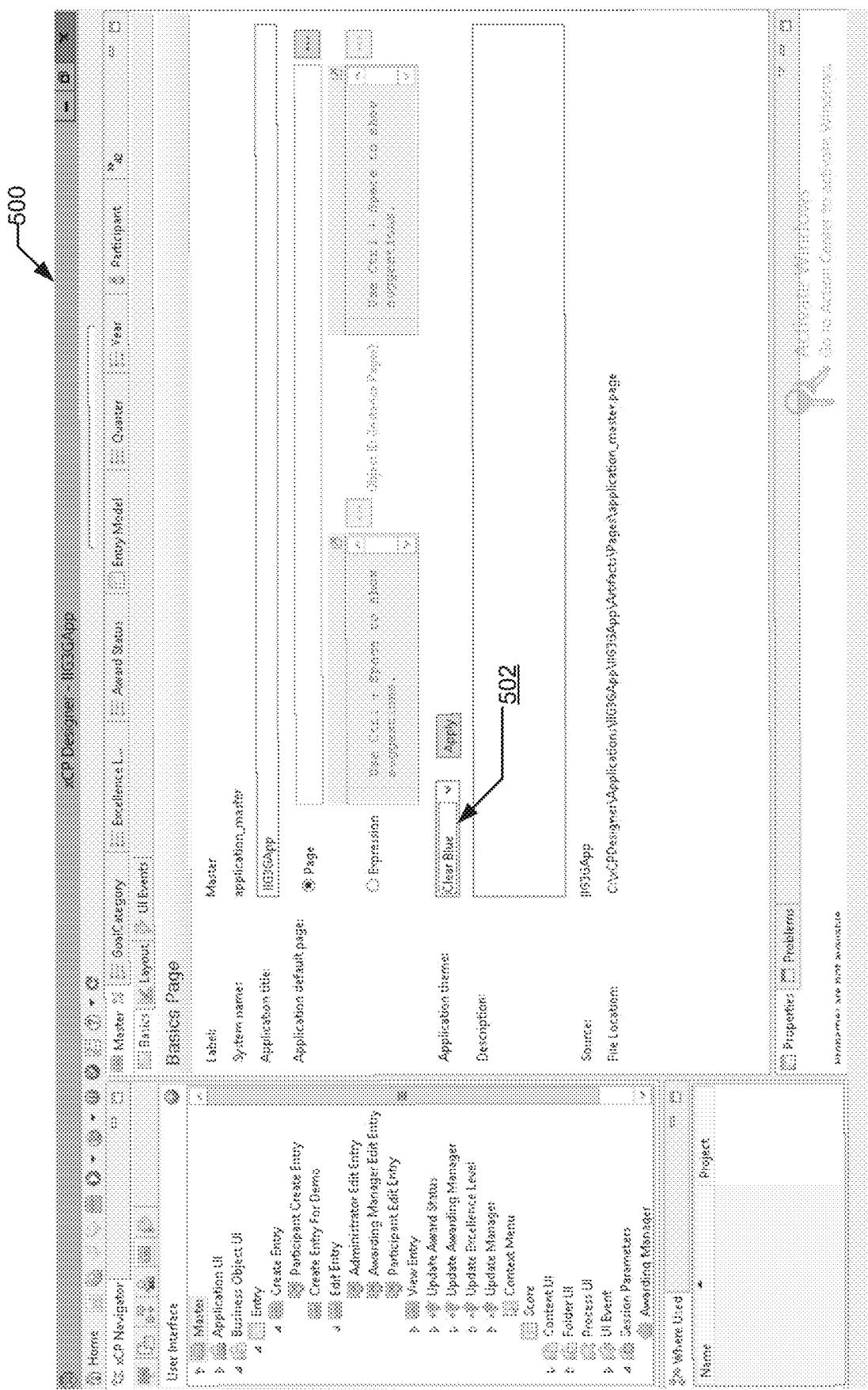
FIG. 5 shows an example in accordance with one or more embodiments of the technology.
Figure 6:
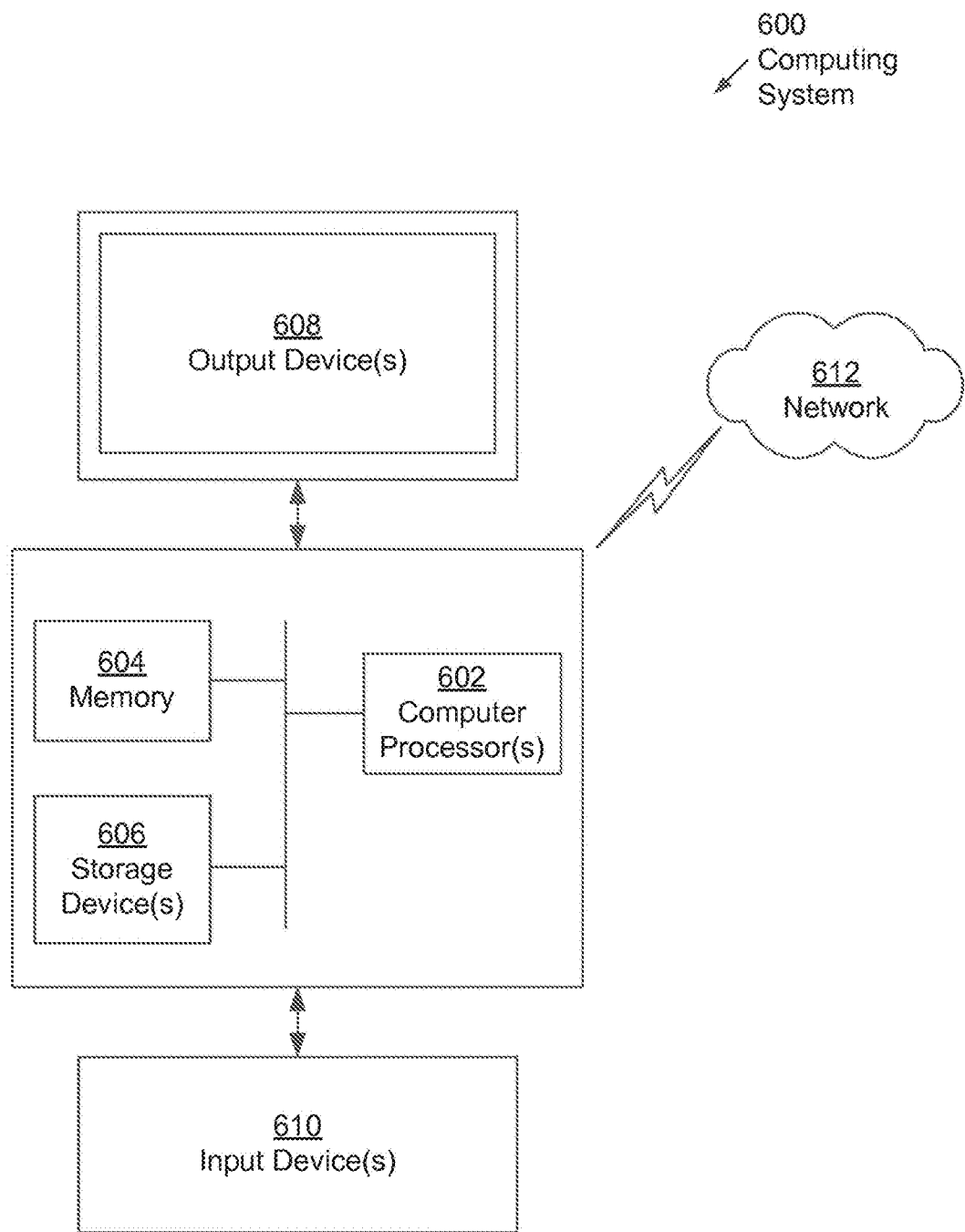
FIG. 6 shows an example computing system in accordance with one or more embodiments of the technology.

In step 302, the user initiates the application of a reusable theme in a web application, for example, by selecting a button in the IDE (see e.g., FIG. 5). In response to step 302, steps 304-308 are preformed.

In step 304, the manifest and the theme implementation file are extracted from the compressed file.

In step 306, the theme implementation file is compiled into the style sheet language (e.g., a CSS file). In one embodiment of the technology, the manifest is used as the starting point for the compilation.

In step 308, the style sheet language file (e.g., the CSS file) generated in step 306 is stored in an application project structure (APS). Further, the images (which were included within the compressed file that was imported in step 300) are extracted from the compressed file and stored in the APS.

In one embodiment of the technology, the APS is a hierarchical file structure that includes two or more levels where each level may include files and/or directories (which may include files and directories). The top level of the APS may be referred to root of the APS and the subsequent levels of the APS may be referred to as child levels. The images and the style sheet language implementation file may be stored at any level in the APS provided with the style sheet language file and the directory in which all images are stored (i.e., all images referenced in the theme implementation file) are at the same level within the APS. Those skilled in the art will appreciate that the style sheet language file and the directory in which all images are stored may be in different locations within the APS without departing from the technology provided that the relationship between the style sheet language file and the directory in which all the images are stored is known.

In step 310, the design of the web application is completed. More specifically, step 310 may include generate HTML for one or more webpages. The HTML also includes a link reference to the style sheet language file such that when the web browser processes the HTML for a given webpage that includes the link reference, the web browser will extract the URL from the link reference and issue an HTTP GET request that includes the URL. The web browser will subsequently receive the corresponding style sheet language file.

In step 312, once the web application has been completed (or at least a portion of a webpage in the web application has been completed), the user of the IDE may attempt to preview the web application or a webpage within the web application. In one embodiment of the technology, the web browser may initiate previewing of a webpage in the web application by sending a request for the HTML for the webpage. The IDE may then process the request in accordance with the steps shown in FIG. 4 (discussed below). More specifically, the IDE may, from the perspective of the web browser (e.g., FIG. 1, 112), operate as a web server (e.g., FIG. 1, 102).

In step 314, a determination is made about whether to apply another reusable theme to the web application. More specifically, a determination is made about whether to replace the current reusable theme with another reusable theme. If a determination is made to apply another reusable theme, then at this stage, if the selected reusable theme has not been previously applied to another web application via the IDE, then steps 302-308 may be performed. Alternatively, if the style sheet language file (e.g. the CSS file) has been generated for the reusable theme, then the process may proceed directly to step 308, in which the style sheet language file and the images are stores in the appropriate locations with in the APS.

Returning to step 314, if a determination is made to keep the current theme for the web application, the process proceeds to Step 316.

In step 316, a web archive file (.war) file is generated, where the .war file includes the contents of the APS and the .war file maintains the hierarchical organization of the APS. Any other file format and/or mechanism may be used to distribute the web application without departing from the technology.

In step 318, the .war file is deployed to a web server. In one embodiment of the technology, deploying the .war file to the web server includes extracting all the content from the .war file and then storing the content in the appropriate locations within a web application structure (WS). In one embodiment of the technology, the WS is a hierarchical file structure that includes two or more levels where each level may include files and or directories (which may include files and directories). The top level of the APS may be referred to root of the WS and the subsequent levels of the WS may be referred to as child levels. The images and the style sheet language implementation file may be stored at any level in the WS provided with the style sheet language file and the directory in which all images are stored (i.e., all images referenced in the theme implementation file) are at the same level within the WS. Those skilled in the art will appreciate that the style sheet language file and the directory in which all images are stored may be in different locations within the WS without departing from the technology provided that the relationship between the style sheet language file and the directory in which all the images are stored is known.

FIG. 4 shows a method for using a reusable theme in a deployed web application in accordance with one or more embodiments of the technology. More specifically, FIG. 4 describes how the reusable theme is implemented in a deployed web application from the perspective of the web server.

In step 400, an HTTP GET request is received from a device. For example, a user may have requested a new webpage (see e.g., FIG. 1, 122) in the web application by clicking on a button on a current webpage that is being displayed in the web browser (see e.g., FIG. 1, 120). The web browser may subsequently generate the HTTP GET request and send it to the web server.

In step 402, in response the HTTP GET request received in step 400, the web server obtains the HTML file for the requested webpage and provides it to the device. Upon receipt of the HTML file, the web browser may begin processing the HTML in order to display the webpage in the web browser. As part of the processing of the HTML, the web browser may encounter a link relationship HTML tag (e.g., <link rel>) that includes a CSS file. The web browser may subsequently issue an HTTP GET request for the CSS file to the web server.

In step 404, the web server receives the HTTP GET request for the CSS file.

In step 406, the web server obtains the CSS file and sends it to the device. Upon receipt of the CSS file, the web browser may begin processing the CSS in order to determine the theme to apply to the content that is to be displayed on the webpage, where the content and location of the content is defined by the HTML file. As part of the processing of CSS file, the web browser may encounter a relative URL for an image, where the web browser needs to obtain the image such that it can be displayed on the webpage. The web browser may subsequently issue an HTTP GET request for the image file to the web server, where the request includes the relative URL.

In step 408, the web server receives the HTTP GET request with the relative URL.

In step 410, the web server resolves the relative URL to obtain an absolute URL. The web server may use the URL resolution service (see e.g., FIG. 1, 114). In one embodiment of the technology, the URL resolution service tracks the relationship between the location of the style sheet language file (e.g., the CSS file) and the location of the images in the WS. The URL resolution service then uses the relationship between the location of the style sheet language file and the location of the images in the WS to generate an absolute URL from the relative URL.

In one embodiment of the technology, when the style sheet language file is located at the same hierarchical level in the WS as the images directory, the absolute location of the image may be resolved as follows: [absolute location of style sheet language file (excluding the style sheet language file itself)]+[relative location of image].

In one embodiment of the technology, when the style sheet language file is located at a different hierarchical level in the WS as the images directory, the absolute location of the image may be resolved as follows: [absolute location of style sheet language file (excluding the style sheet language file itself)]+[portion of the absolute location of the image determined using information about relationship between the location of the style sheet file and the images directory]+[relative location of image].

In one embodiment of the technology, when the style sheet language file is located at a different hierarchical level in the WS as the images directory, the absolute location of the image may be resolved as follows: [portion of the absolute location of the image determined using information about relationship between the location of the style sheet file and the images directory]+[relative location of image].

Continuing with FIG. 4, in step 412, the absolute URL is used to obtain the image from the WS on the web server. In step 414, the image is sent to the device. The web browser, on the device, subsequently displays the image on the webpage.

The following example is for explanatory purposes only and not intended to limit the scope of the technology.

Turning to the example, consider a scenario in which the user obtains the following manifest for a reusable theme named "My Theme."
Manifest-Version: 1.1
Created-By: My Team
Built-By: My team
Build-Jdk: 1.7.0_51
Theme-Name: My Theme
Theme-Sass-File: mytheme.scss
Bundle-Name: My Theme
Bundle-SymbolicName: MyTheme
Bundle-Version: 1.0
NAMESPACE: my
Copyright: EMC Corporation
Version: 1.0

The combination of <namespace, bundle-symbolic name, and bundle-version> may uniquely identify the reusable theme.

The user may subsequently, using the theme designer, obtain or generate a .scss file (i.e., the theme implementation file) entitled: mytheme.scss. The manifest, the generated .scss file and the images referenced by the .scss file may be stored in the theme library project structure (TLPS). An example of the TLPS is shown below.

```
mytheme
    mytheme.scss
        :
        .search {
            background-image: url('images/search.png');
        }
        :
    META-INF/
    MANIFEST.mf
    images/
        search.png
```

In this example, the root of the TLPS includes mytheme.scss, the directory "META-INF" and the directory "images." Further, mytheme.scss includes a relative reference ("images/search.png") for the image search.png. The TLPS (including its content) may subsequently be compressed into a .jar file entitled: my.MyTeme-1.0.jar.

The IDE, in response to a user action, may subsequently import and apply the reusable theme defined by contents of my.MyTheme-1.0.jar. For example, FIG. 5 shows an IDE (500) that includes an apply button (502) that, when clicked by the user, initiates the steps described in FIG. 3 in order to apply the select reusable theme to the web application. Continuing with the discussion of the example, the result of applying the reusable theme is an application project structure (APS) that includes mytheme.css (i.e., the compiled version of the mytheme.scss) and the images referenced in mytheme.css. In this example, mytheme.css includes a relative reference (i.e., Images/search.png) to the image search.png. The APS is shown below. For purposes of this example, the HTML files for various webpages are not shown in the APS. Further, assume that the APS is for a single web application that includes a number of webpages, where the content and layout of each webpage is defined using HTML and the theme associated with the each of the webpages is defined by mytheme.css.

```
MyApp
    :
    :
    lib/
        my.MyTheme-1.0.jar
    src/
        main/
            webapp/
                js/
                    resources/
                        css/
                            mytheme.css
                            images/
                                search.png
```

As shown above, the relative location of the mytheme.css (which is a compiled version of mytheme.scss) and the images directory is the same in the APS is the same as the relative location of the mytheme.scss and the images directory is the same TLPS.

The APS is subsequently used to generate a .war file, e.g., my.mytheme-1.0.war. The .war file is subsequently deployed to a web server, where the content of the my.mytheme.war is extracted in order to generate the web application structure (WS). The WS is shown below. Though not shown in the WS, the WS also includes the HTML for webpages in the web application.

```
webapps/
    MyApp/
        Js/
            resources/
                css/
                    mytheme.css
                    images/
                        search.png
```

As shown above, the relative location of the mytheme.css and the images directory is the same in the APS and the WS. As discussed below, the relationship between the location of mytheme.css and the images directory is used to resolve the relative URL (i.e., 'images/search.png') in mytheme.css.

Once the web application is deployed to the web server, the web server may receive requests for a webpage of the web application from one or more devices. The following scenario describes an exemplary interaction between the web server and a device.

In S1, the web server receives an HTTP GET request for a webpage in the web application from a device. In S2, the web server returns HTML for the requested webpage. In S3, the web browser, on the device, parses the HTML (using an HTML parser) and encounters a link reference to a .css file (e.g., <link rel="stylesheet" href="/includes/c/style.css" type="text/css"/>). In S4, the web browser issues an HTTP GET request for the .css file to the web server. In S5, the web browser receives .css file from the web server. In S6, the CSS parser in the web browser parses .css file and encounters a relative URL to an image (e.g., images/search.png). In S7, the web browser issues an HTTP GET request for image where the aforementioned request includes the relative URL for the image.

In S8, the URL resolution server resolves the relative URL to an absolute URL by using the location of the corresponding .css file. More specifically, the URL resolution services tracks the relationship between the location of the images directory and the location of the .css file. In the instant example, the .css file and the images directory are at the same hierarchical level in the WS. Accordingly, the absolute URL for the image is determined as follows: [absolute location of style sheet language file (excluding the style sheet language file itself)]+[relative location of image]. Thus, in this example, the absolute URL for the image is: webapps/MyApp/Js/resources/css/images/search.png.

In S9, the web server subsequently obtains the image using the absolute URL. In S10, the web server sends the image to the web browser. In S11, the web browser subsequently renders the image on the webpage.

One or more embodiments of the technology enable the generation of a reusable theme by using relative locations (or URLs) for the images used by the theme. By using relative locations for images in the reusable themes, the reusable themes may be applied to any web application without requiring any prior knowledge of the absolute location of the images referenced in the reusable theme. Further, the reusable theme may be applied to a web application without any modification to the reusable theme (or, more specifically, without any modification to the .css file). Said another way, the relative locations of the images that are specified in the .css file do not need to be updated when the reusable theme is applied to different web application regardless of where the referenced images are actually stored. Rather, the URL resolution service tracks the relationship between the .css file in the web application structure (WS) and the location of the images directory in the WS and uses this information to resolve, at run time, the relative URL to an absolute URL.

Further, one or more embodiments of the technology provide a self-contained theme such that all images that are referenced by the reusable theme are present in the .jar file. The use of the .jar file (or another compressed file) provides an efficient mechanism to deploy the reusable theme, such that it may be readily applied to many different web applications.

While various embodiments of the technology have discussed the use of SCSS and CSS, embodiments of the technology are not limited to the SCSS and CSS. Rather, embodiments of the technology may be implemented using any know style sheet language and any know language that may be compiled into any know style sheet language without departing from the technology.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for generating a web application, comprising:
receiving, in an integrated development environment (IDE) software development tool executing on a first computing system, a selection of a reusable theme;
applying, by a web application designer of the IDE, the reusable theme to the web application and generating a deployable updated web application, wherein applying the reusable theme comprises:
generating a style sheet language file stored in a first directory in a deployable application project structure associated with the IDE, wherein the style sheet language file includes a relative location for an image which is stored in a second directory within the first directory, wherein the image is to be displayed on at least one webpage of the deployable updated web application;
receiving a request to view the deployable updated web application, wherein the deployable updated web application includes a reference to the style sheet language file;
in response to the request:
resolving the relative location for the image to obtain an absolute location for the image using a location of the style sheet language file in the deployable application project structure;
obtaining the image from the absolute location of the image;
displaying the image within the at least one webpage on a web browser.

2. The method of claim 1, wherein the request to preview the updated web application is initiated from the web browser, wherein the IDE comprises the web browser.

3. The method of claim 1, wherein generating the style sheet language file comprises compiling a theme implementation file using a manifest, wherein the manifest specifies at least a name of the theme implementation file, a symbolic name, and a namespace.

4. The method of claim 3, further comprising:
obtaining a compressed file comprising the theme implementation file, the manifest, and the image; and
extracting the theme implementation file, the manifest, and the image from the compressed file,
wherein the compressed file is organized using an archive structure,
wherein the archive structure comprises a third directory comprising the image;
wherein the theme implementation file is stored in a fourth directory, wherein the fourth directory comprises the third directory.

5. The method of claim 4, wherein the compressed filed is a Java Archive formatted file.

6. The method of claim 4, wherein a name of the compressed file is determined using the namespace and the symbolic name.

7. The method of claim 1, wherein the absolute location comprises a file path from a root directory to the second directory and the relative location.

8. The method of claim 7, wherein the IDE comprises a URL resolution service, wherein resolving the relative location for the image to obtain the absolute location for the image is performed by the URL resolution service.

9. The method of claim 1, further comprising deploying the deployable updated web application including the deployable application project structure from the IDE executing on the first computing system to a web server executing on a second computing system.

10. A non-transitory computer readable medium comprising computer readable program code, which when executed by a computer processor enables the computer processor to:
    receive, in an integrated development environment (IDE) software development tool executing on a first computing system, a selection of a reusable theme;
    apply, by a web application designer of the IDE, the reusable theme to a web application and generate a deployable updated web application, wherein applying the reusable theme comprises:
        generating a style sheet language file stored in a first directory in a deployable application project structure associated with the IDE, wherein the style sheet language file includes a relative location for an image which is stored in a second directory within the first directory, wherein the image is to be displayed on at least one webpage of the deployable updated web application;
        receive a request to view the deployable updated web application, wherein the deployable updated web application includes a reference to the style sheet language file;
        in response to the request:
            resolve the relative location for the image to obtain an absolute location for the image using a location of the style sheet language file in the deployable application project structure;
            obtain the image from the absolute location of the image;
            display the image within the at least one webpage on a web browser.

11. The non-transitory computer readable medium of claim 10, wherein the request to preview the updated web application is initiated from the web browser, wherein the IDE comprises the web browser.

12. The non-transitory computer readable medium of claim 10, wherein generating the style sheet language file comprises compiling a theme implementation file using a manifest, wherein the manifest specifies at least a name of the theme implementation file, a symbolic name, and a namespace.

13. The non-transitory computer readable medium of claim 12, further comprising computer readable program code, which when executed by a computer processor enables the computer processor to:
    obtain a compressed file comprising the theme implementation file, the manifest, and the image; and
    extract the theme implementation file, the manifest, and the image from the compressed file,
    wherein the compressed file is organized using an archive structure,
    wherein the archive structure comprises a third directory comprising the image;
    wherein the theme implementation file is stored in a fourth directory, wherein the fourth directory comprises the third directory.

14. The non-transitory computer readable medium of claim 13, wherein the compressed filed is a Java Archive formatted file.

15. The non-transitory computer readable medium of claim 13, wherein a name of the compressed file is determined using the namespace and the symbolic name.

16. The non-transitory computer readable medium of claim 10, wherein the absolute location comprises a file path from a root directory to the second directory and the relative location.

17. The non-transitory computer readable medium of claim 16, wherein the IDE comprises a URL resolution service, wherein resolving the relative location for the image to obtain the absolute location for the image is performed by the URL resolution service.

18. The non-transitory computer readable medium of claim 10, wherein the computer readable program code, when executed by the computer processor further enables the computer processor to deploy the deployable updated web application including the deployable application project structure from the IDE executing on the first computing system to a web server executing on a second computing system.

* * * * *

UNITED STATES PATENT AND TRADEMARK OFFICE
CERTIFICATE OF CORRECTION

PATENT NO. : 10,831,988 B2
APPLICATION NO. : 16/455351
DATED : November 10, 2020
INVENTOR(S) : Sandip V. Chitale and Sachin Gopaldas Totale It is certified that error appears in the above-identified patent and that said Letters Patent is hereby corrected as shown below:

In the Specification

Column 3, Line 66, delete "sever" and insert -- server --

Column 6, Line 9, delete "preformed" and insert -- performed --

Column 7, Line 4, delete "with in" and insert -- within --

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*